United States Patent
Lee

(10) Patent No.: US 7,265,880 B2
(45) Date of Patent: Sep. 4, 2007

(54) SYSTEM FOR DETERMINING RETURN OF PHOTO SENSOR IN SCANNER AND METHOD THEREOF

(75) Inventor: Fu-Wen Lee, Taipei (TW)

(73) Assignee: Primax Electronics Ltd., Taipei (TW)

( * ) Notice: Subject to any disclaimer, the term of this patent is extended or adjusted under 35 U.S.C. 154(b) by 391 days.

(21) Appl. No.: 11/043,956

(22) Filed: Jan. 28, 2005

(65) Prior Publication Data

US 2006/0170985 A1  Aug. 3, 2006

(51) Int. Cl.
*H04N 1/04* (2006.01)
*H04N 1/40* (2006.01)

(52) U.S. Cl. .............. 358/497; 358/474; 358/471; 358/488

(58) Field of Classification Search ........ 358/497, 358/494, 496, 474, 486, 505, 501, 401, 488, 358/471; 382/312, 318, 319; 399/211, 212; 250/234–236, 208.1, 216
See application file for complete search history.

(56) References Cited

U.S. PATENT DOCUMENTS 5,687,010 A * 11/1997 Van Tilborg et al. ....... 358/496
6,388,778 B1 * 5/2002 Ko-Chien ................. 358/497

* cited by examiner

*Primary Examiner*—Cheukfan Lee
(74) *Attorney, Agent, or Firm*—Rabin & Berdo, P.C.

(57) ABSTRACT

A system for determining the return of the photo sensor in the scanner and the method thereof are disclosed. There are two base position sensing units in the system. Each of the base position sensing units computes the currents in two sections of a line resistance material defined by the position of the photo sensor after a document is scanned to determine which base position sensing unit the photo sensor should return to. This method reduces the return time of the photo sensor than the prior art in which the photo sensor can only return to a single end. Therefore, the system helps achieving the goals of increasing the scanning efficiency and saving power. Moreover, the system realizes the image scanning in both directions.

18 Claims, 3 Drawing Sheets

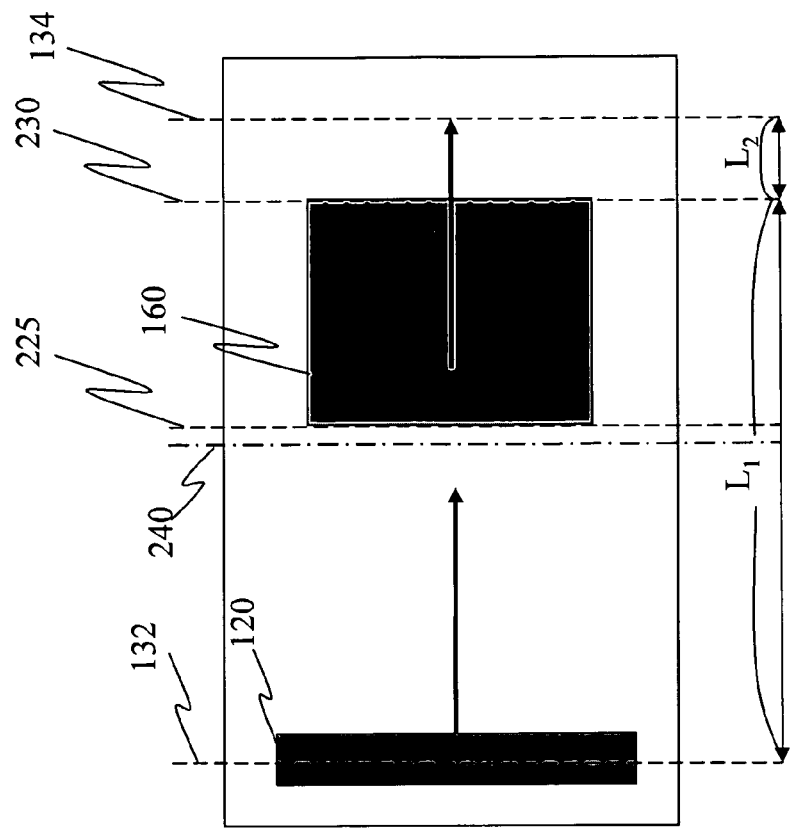
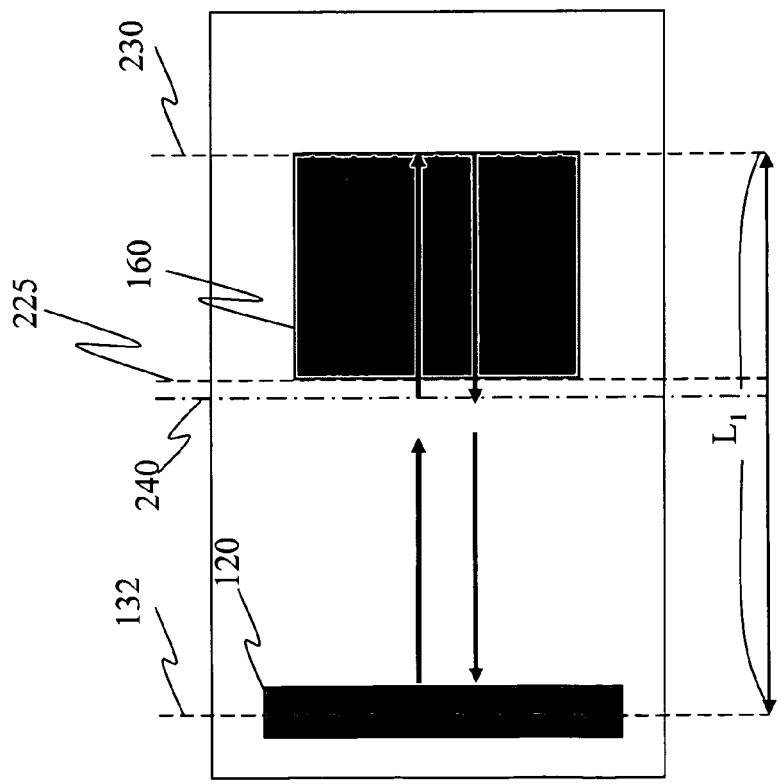
FIG.2A (PRIOR ART)
FIG.2B

_US 7,265,880 B2_

SYSTEM FOR DETERMINING RETURN OF PHOTO SENSOR IN SCANNER AND METHOD THEREOF

BACKGROUND OF THE INVENTION

1. Field of Invention

The invention relates to a system for determining the return of the photo sensor in a scanner and the method thereof. In particular, the invention relates to a system for determining the return of the photo sensor in a scanner by using a line resistance material and measuring the currents of the two sections defined by the position of the photo sensor.

2. Related Art

The image scanners cannot become popular due to their low resolutions and high prices in the past. In recent years, photo sensors are mass-produced using the mature production technology. Under the competition of all manufacturers, document scanning is accessible to normal users and the scanners have become one device of the personal computer. They are used to convert images of normal pictures, text, and graphs into digital data that can be displayed, edited, stored, and printed in a computer. The huge amount of data in an enterprise can be scanned into files using the scanners and then sent to relevant recipients by E-mail. This avoids the unnecessary use of paper and document transfers. Image scanner manufacturers often give the users software for word recognition, image processing, English-Chinese translation, and faxing. One can thus use the scanner to scan documents and convert the scanned document using the word recognition system into digital codes. This reduces the space for storing documents.

According to their functions and operating methods, the scanner can be divided into the following categories: handheld scanners, flatbed scanners, sheetfed scanners, film scanners, large format scanners, camera scanners, and drum scanners. In particular, the flatbed scanners have more advances in recent years, rendering a more stable scanning quality and lower cost. Moreover, it can be accompanied with an automatic document feeder (ADF), which enables the device to scan a whole set of documents of the same physical size. Therefore, they have become the mainstream on the market.

FIG. 2A shows a top view of the conventional scanner. From the drawing, we can understand the scanning procedure. The photo sensor 120 starts the first base position sensing unit 132 and moves along the direction of the arrow on the scanning platform on which the document 160 is placed until reaching the beginning 225 of the document 160. Afterwards, the document 160 is read into the photo sensor until the rightmost end 230. The photo sensor 120 then returns along the original path back to 132. During the whole scanning process, the photo sensor travels a distance of $2L_1$. If the rightmost end 230 of the document exceeds the middle line 240, which is midway between the opposite ends of the scanning platform, then some of the scanning time is wasted in non-scanning processes.

SUMMARY OF THE INVENTION

In view of the foregoing, the invention provides a system for determining the return of the photo sensor in a scanner and the method for the same. When document scanning is done, the invention compares the electrical currents in two sections of a line resistance material to determine which base position sensing unit the photo sensor should return to. The invention can shorten the traveling distance of the photo sensor, achieving the goals of speeding up the scanning and saving energy.

The disclosed system includes: (A) a photo sensor; (B) a first base position sensing unit; (C) a second base position sensing unit; (D) a metal component; (E) a line resistance material; and (F) an electrical current meter.

The photo sensor converts the analog image reflected from the document into a digital signal. The first base position sensing unit and the second base position sensing unit are used to determine whether the photo sensor is at a correct position and which end it should start scanning. The metal component is disposed under the photo sensor and moves as the photo sensor moves. It is charged with positive charges. The line resistance material allows the metal component to slide thereon. The contact point of the metal component divides the line resistance material into to sections. The electrical current meter measures the electrical currents of the two sections.

The disclosed method includes the following steps. First, after scanning a document, the position of the photo sensor is taken as a boundary. The first base position sensing unit to the boundary is the first resistance. The boundary to the second base position sensing unit is the second resistance. If the current of the first resistance is greater than that of the second resistance, then the photo sensor returns to the first base position sensing unit, and the next scanning starts from here. If the current of the second resistance is greater than that of the first resistance, then the photo sensor returns to the second base position sensing unit, and the next scanning starts from here.

BRIEF DESCRIPTION OF THE DRAWINGS

The invention will become more fully understood from the detailed description given hereinbelow illustration only, and thus are not limitative of the present invention, and wherein:

FIG. 2A is a schematic view of the action of a conventional scanner;

FIG. 2B is a schematic view of the action of the disclosed system; and

DETAILED DESCRIPTION OF THE INVENTION

Figure 1A:
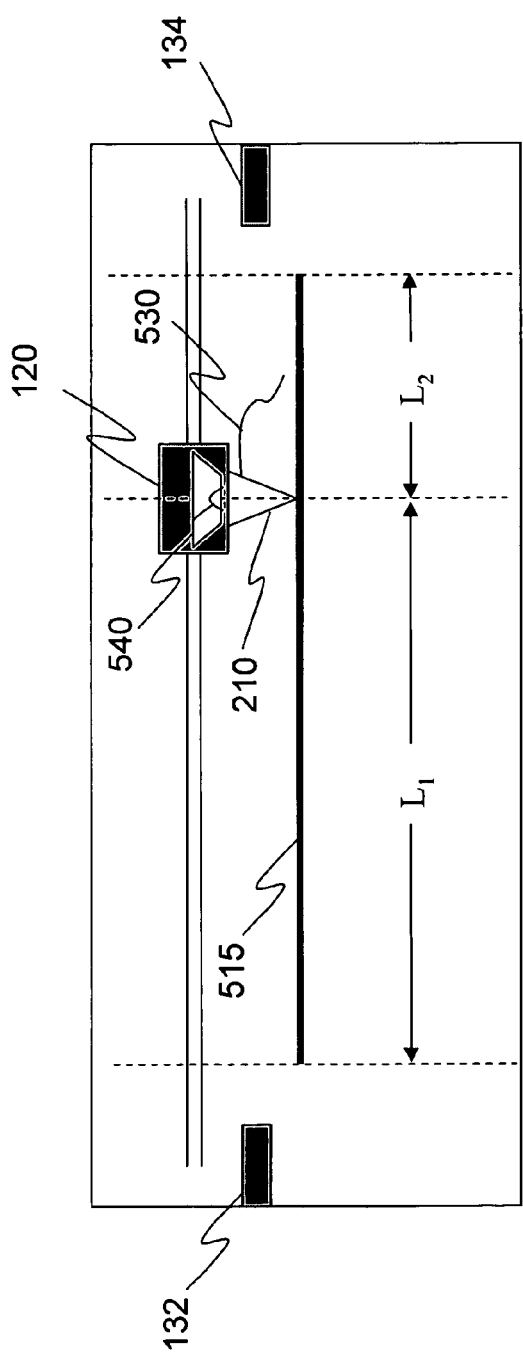
FIG. 1A is a schematic view of the side view of the disclosed system for determining the return of the photo sensor in a scanner.

A schematic view of the system for determining the return of the photo sensor in a scanner is shown in FIG. 1A. The system includes: (A) a photo sensor 120; (B) a first base position sensing unit 132; (C) a second base position sensing unit 134; (D) a metal component 210; (E) a line resistance material 515; and (F) an electrical current meter 540. We describe their functions as follows.

(A) The photo sensor 120 is the most important part of the scanner. It is used to scan a document and converts the scanned analog signal into a digital signal. Its basic principle is to shine a beam of light on a document placed on a platform. The reflected light of different colors will produce different current reactions when it hits charges. The current reactions are converted into a digital signal.

(B) The first base position sensing unit 132 and (C) the second base position sensing unit 134 are disposed on both ends of the scanning platform to determine whether the photo sensor 120 is at one of the base positions. The two base position sensing units can be sensors or micro switches. If the photo sensor 120 is at one base position, it will be detected by one of the base position sensing units and triggers it to send out a signal. This signal confirms the scanning action and determines which end to start the scanning. Every time the photo sensor finishes a scanning, it is returned to one of the base positions for the next scanning.

(D) The metal component 210 is disposed under the photo sensor 120 and moves as the photo sensor 120 moves. It is charged with positive charges. After each scanning, the place where the metal component 210 stays, i.e. the contact point between the metal component 210 and the line resistance material 515, is taken as the boundary that divides the line resistance material 515 into two sections. Commonly used metal components 210 include steel wheels and metal chips.

Figure 1B:
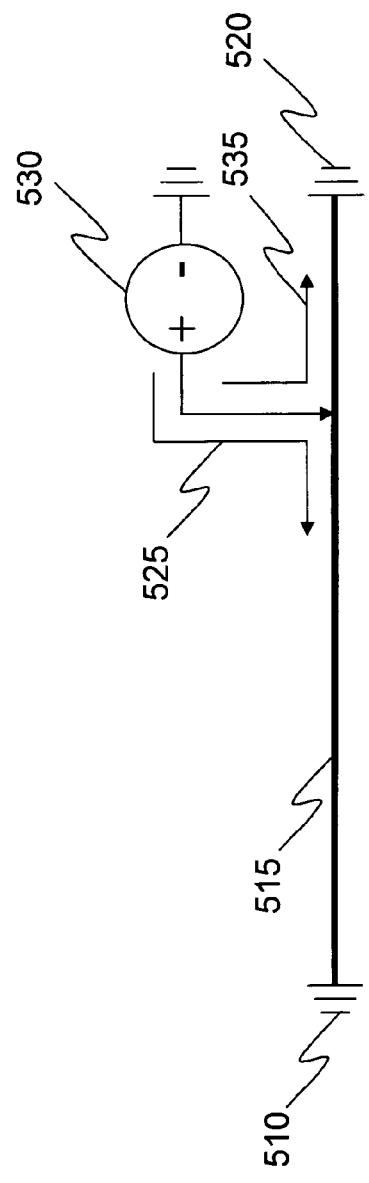
FIG. 1B is a schematic view of the circuit with two sections of resistance formed by the metal component and the line resistance material.

The line resistance material 515 is disposed under the metal component 210 for the metal component 210 to slide thereon. The contact point between the metal component 210 and the line resistance material 515 is taken as the boundary that divides the line resistance material 515 into two sections. As shown in FIG. 1B, we use a positive voltage source 530 to charge the metal component 210 with positive charges. The left end of the line resistance material 515 is connected to the ground 510. The electrical current flows from a high voltage to a low voltage, forming a first current 525 for the first section. Likewise, the right end of the line resistance material is connected to the ground 520. The electrical current flows from a high voltage to a low voltage, forming a second current 535 for the second section.

(F) The electrical current meter 540 measures the first current 525 in the first section produced between the positively charged metal component 210 and the first base position sensing unit 132 and the second current 535 in the second section produced between the positively charged metal component 210 and the second base position sensing unit 134. It further compares the magnitudes of the two currents.

Figure 3:
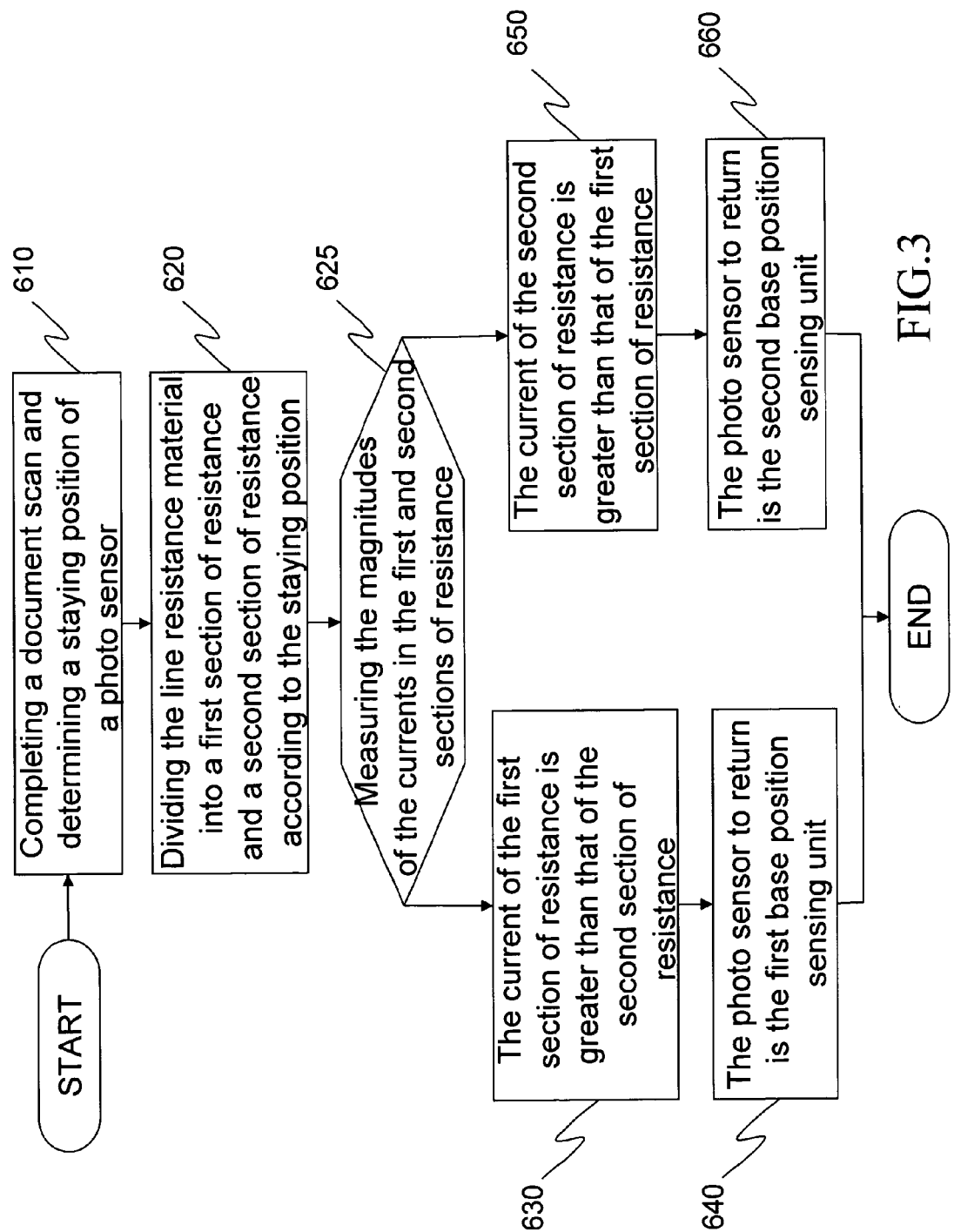
FIG. 3 is a flowchart of the disclosed method for determining the return of the photo sensor in a scanner.

We can use FIG. 3 to explain the main procedure in the invention.

First, after the scanner finishes scanning a document, a staying position of the photo sensor is determined (step 610). Since a metal component is provided under the photo sensor and charged with positive charges. The other end of the metal component is in contact with the line resistance material. After the photo sensor finishes scanning, its staying position is taken as the boundary. Besides, the metal component is not driven by the photo sensor. Therefore, where the photo sensor stays indicates the contact point between the metal component and the line resistance material. From the first base position sensing unit to the boundary is the first section of resistance. From the boundary to the second base position sensing unit is the second section of resistance (step 620). The electrical current meter then measures the currents in the two sections (step 625).

According to Ohm's law, given a fixed voltage the electrical current is inversely proportional to the resistance. We also know that the longer the line resistance material is, the larger its resistance is. Therefore, if the current in the first section of resistance is greater than that in the second section of resistance (step 630), it means that the length of the first section of resistance is smaller than that of the second section of resistance. Thus, the photo sensor should return to the first base position sensing unit (step 640). The next scanning starts from here. If the current in the first section of resistance is smaller than that in the second section of resistance (step 650), it means that the length of the first section of resistance is larger than that of the second section of resistance. Thus, the photo sensor should return to the second base position sensing unit (step 660). The next scanning starts from here.

With reference to FIG. 2B, the rightmost end of the document exceeds the middle line 240, i.e. $L_1$ is greater than $L_2$. Using the disclosed method, the photo sensor 120 only travels a distance of $L_1+L_2$, instead of $2L_1$ as in the prior art. Therefore, the invention achieves the effects of shortening the traveling distance of the photo sensor 120 during one scan, and thus saving energy and speeding up the scanning.

Certain variations would be apparent to those skilled in the art, which variations are considered within the spirit and scope of the claimed invention.

What is claimed is:

1. A system for determining a return of a photo sensor in a scanner with two end positions, comprising:

a photo sensor, which scans a document and converts an analog signal obtained from the scanning into a digital signal;

a first base position sensing unit, which is installed on one end base position in a scanning region of the scanner;

a second base position sensing unit, which is installed on the other end base position in the scanning region of the scanner;

a metal component, which is provided under the photo sensor, moves along with the photo sensor, and is charged with positive charges;

a line resistance material, which is provided under the metal component for the metal component to slide thereon, the position where the metal component stays being taken as a boundary to divide the line resistance material into two sections; and an electrical current meter, which measures a first current in a first section of resistance between the metal component and the first base position sensing unit and a second current in a second section of resistance between the metal component and the second base position sensing unit;

wherein magnitudes of the measured currents are used to determine a position for the photo sensor to return.

2. The system of claim 1, wherein the first base position sensing unit and the second base position sensing unit are sensors.

3. The system of claim 1, wherein the first base position sensing unit and the second base position sensing unit are micro switches.

4. The system of claim 1, wherein the metal component is a steel wheel.

5. The system of claim 1, wherein the metal component is a metal chip.

6. The system of claim 1, wherein measuring the currents in the two sections provides a length relation of the two sections of resistance.

7. The system of claim 1, wherein both ends of the line resistance material are connected to the ground.

8. The system of claim 1, wherein the position for the photo sensor to return is the first base position sensing unit when the current of the first section of resistance is greater than that of the second section of resistance and the second base position sensing unit when the current of the second section of resistance is greater than that of the first section of resistance.

9. A method for determining a return of a photo sensor in a scanner with a first base position sensing unit and a second base position sensing unit on both ends of a scanning region of the scanner, the method comprising the steps of:

scanning a document and determining a staying position of a photo sensor;

dividing a line resistance material into a first section of resistance and a second section of resistance according to the staying position;

measuring magnitudes of currents in the first and second sections of resistance; and determining a position for the photo sensor to return according to the magnitudes of the currents in the first and second sections of resistance.

10. The method of claim 9, wherein the currents in the two sections are generated by charging a metal component with positive charges and both ends of the line resistance material connected to the ground.

11. The method of claim 10, wherein the metal component is a steel wheel.

12. The method of claim 10, wherein the metal component is a metal chip.

13. The method of claim 9, wherein the currents are measured using an electrical current meter.

14. The method of claim 9, wherein the metal component moves along with the photo sensor on the line resistance material.

15. The method of claim 9, wherein the currents in the two sections provide a length relation of the two sections of resistance.

16. The method of claim 9, wherein the position for the photo sensor to return is the first base position sensing unit when the current of the first section of resistance is greater than that of the second section of resistance and the second base position sensing unit when the current of the second section of resistance is greater than that of the first section of resistance.

17. The method of claim 16, wherein the first base position sensing unit and the second base position sensing unit are sensors.

18. The method of claim 16, wherein the first base position sensing unit and the second base position sensing unit are micro switches.

* * * * *